(12) United States Patent
Parent

(10) Patent No.: US 6,186,531 B1
(45) Date of Patent: Feb. 13, 2001

(54) THREADED/NON-THREADED SPLIT SHANK FOR HITCHES DRAWBARS AND THE LIKE

(75) Inventor: Richard Arthur Parent, Edmonton (CA)

(73) Assignee: Par-Ten Products Ltd., Edmonton (CA)

( * ) Notice: Under 35 U.S.C. 154(b), the term of this patent shall be extended for 0 days.

(21) Appl. No.: 09/494,499

(22) Filed: Jan. 31, 2000

Related U.S. Application Data

(60) Provisional application No. 60/118,488, filed on Feb. 3, 1999.

(51) Int. Cl.⁷ ..................................................... B60D 1/00
(52) U.S. Cl. .......................... 280/506; 280/504; 224/519
(58) Field of Search ................................. 280/506, 504, 280/495, 491.5; 224/519

(56) References Cited

U.S. PATENT DOCUMENTS

| | | |
|---|---|---|
| 4,050,714 | 9/1977 | Epp . |
| 4,131,296 | 12/1978 | Strader . |
| 4,278,376 * | 7/1981 | Hunter .................................. 410/130 |
| 4,552,377 | 11/1985 | Folkerts . |
| 4,678,199 * | 7/1987 | Dickmann ............................ 280/491 |
| 4,746,138 | 5/1988 | James . |
| 4,773,668 | 9/1988 | Muonro . |
| 4,807,899 | 2/1989 | Belcher . |
| 4,817,978 | 4/1989 | James . |
| 4,856,686 | 8/1989 | Workentine . |
| 5,000,067 | 3/1991 | Kolbusz et al. . |
| 5,011,178 | 4/1991 | Sanderson . |
| 5,244,133 | 9/1993 | Abbott et al. . |
| 5,322,315 | 6/1994 | Carsten . |
| 5,333,888 | 8/1994 | Ball . |
| 5,344,175 | 9/1994 | Speer . |
| 5,380,030 | 1/1995 | Gullickson . |
| 5,423,566 | 6/1995 | Warrington et al. . |
| 5,492,454 * | 2/1996 | Colyer .................................... 414/462 |
| 5,540,065 | 7/1996 | Wyers . |
| 5,593,172 | 1/1997 | Breslin . |
| 5,615,904 | 4/1997 | Van Dusen et al. . |
| 5,685,686 | 11/1997 | Burns . |
| 5,730,456 | 3/1998 | Bowers . |
| 5,823,560 | 10/1998 | Van Vleet . |

FOREIGN PATENT DOCUMENTS

2235668 * 3/1991 (GB) ..................................... 280/504

OTHER PUBLICATIONS

C.R. Brophy Machine Works Inc. catalogue, p. 10, 2 Receiver Stabilizer Bracket.
Bauer Vehicle Gear, "Anti–Wobble Stick" and "Hitch Pin Lock".

(List continued on next page.)

Primary Examiner—Brian L. Johnson
Assistant Examiner—Daniel Yeagley
(74) Attorney, Agent, or Firm—Oyen Wiggs Green & Mutala

(57) ABSTRACT

This invention relates to a threaded and/or non-threaded split shank for a hitch receiver drawbar, implement, and the like, and securing the split shank to the hitch receiver with two bolts, one from each side, or with a draw bolt or with a conventional draw pin. If the split shank is fastened with two bolts, or a draw bolt, the exterior walls of the split shank are forced outwardly against the interior walls of the hitch receiver and movement between the split shank and hitch receiver is eliminated. The absence of movement between the split shank and the hitch receiver prevents the hitch receiver and the implement shank from wearing out and loosening, and greatly reduces the chances of the implement shank rusting solid in the hitch receiver tube, thereby making the shank impossible to remove. The split shank also adds overall strength and reinforcement to the hitch receiver.

12 Claims, 2 Drawing Sheets

OTHER PUBLICATIONS

Swagman–Danik Industries Ltd., "Locking Hitch Pins".
Reese catalogue, security items.
Computer print–out re "Clamptite Trailer Hitch Brace".
Stagnarkway 1998 catalogue, p. 416, "Rattle–Free Ball Mount".
Computer print–out re Blue Ox "Receiver Locks".
Surco Products catalogue, "The Eliminator" OSI Bike Rack.
Transfo–Rakzs catalogue, 2 stabilizer.
Draftmaster advertisement for "Security Hitch Bolt".
Draw–Tite Inc., photo of Hitch Lock.

* cited by examiner

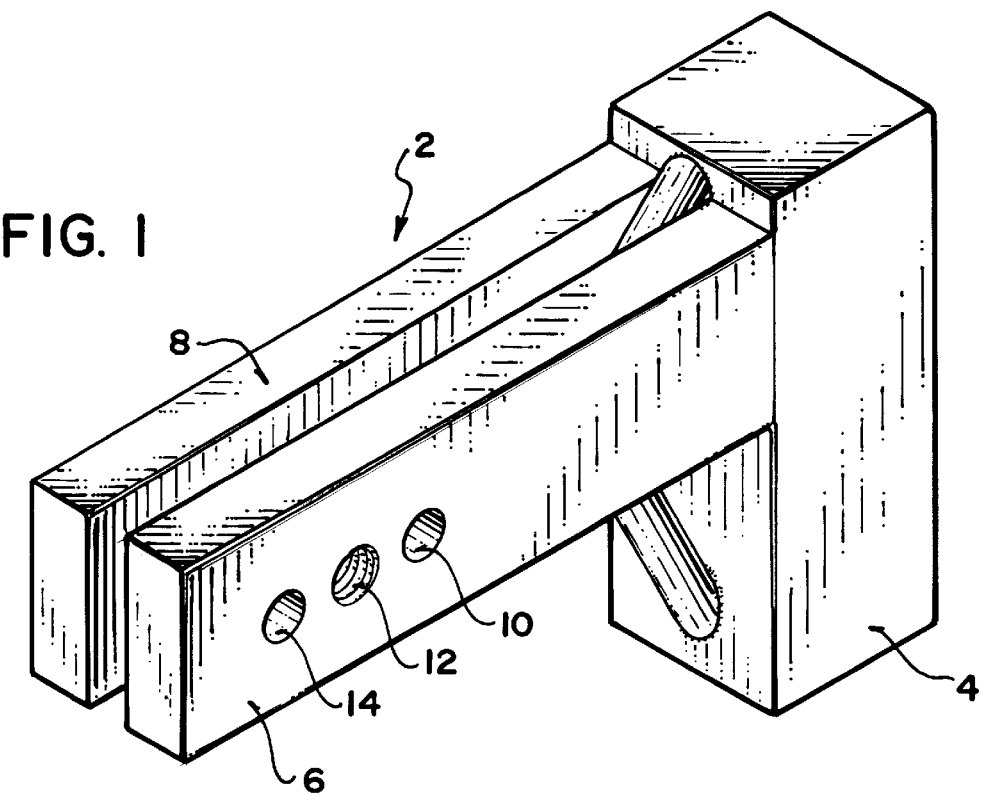
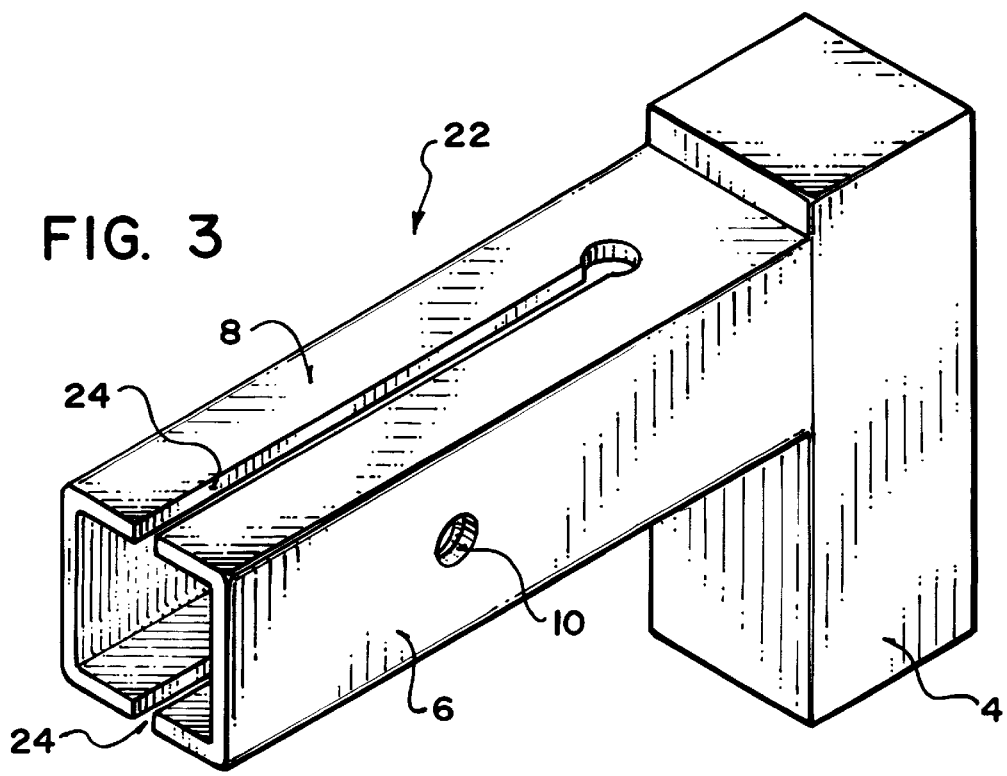

THREADED/NON-THREADED SPLIT SHANK FOR HITCHES DRAWBARS AND THE LIKE

This non-provisional application claims under 35 U.S.C. § 119(e) the benefit of provisional application Ser. No. 60/118,488, filed Feb. 3, 1999.

FIELD OF THE INVENTION

This invention relates to a threaded and/or non-threaded split shank for a hitch receiver drawbar, implement, and the like, and a means of securing that split shank to the hitch receiver with two bolts, one from each side, or with a draw bolt or with a conventional draw pin. If the split shank is fastened with two bolts or a draw bolt, the exterior walls of the split shank are forced outwardly against the interior walls of the hitch receiver and movement between the split shank and hitch receiver is eliminated. The absence of movement between the split shank and the hitch receiver prevents the hitch receiver and the implement shank from wearing out and loosening, and greatly reduces the chances of the implement shank rusting solid in the hitch receiver tube, thereby making the shank impossible to remove. The split shank also adds overall strength and reinforcement to the hitch receiver.

BACKGROUND

Two-part hitches installed on vehicles such as cars, vans and light trucks have become popular for towing trailers and other wheeled devices, and for mounting bicycle racks, wheel chair racks, and the like on the vehicle. An advantage is that the protruding shank which is removably installed in the hitch receiver, which is bolted to the frame of the vehicle, can be removed when not in use. Two-part hitches usually comprise a detachable drawbar, or equalizer hitch implement, or the like, which typically have either a hollow tube type shank or solid type shank. A solid shank is strong and durable and is preferred over a hollow tube type shank in heavy duty applications. The shank removably fits into a square tube hitch receiver which is permanently secured to the vehicle. The implement shank is secured to the hitch receiver by a detachable draw pin, which penetrates through holes in the hitch receiver and the shank. The draw pin holds the two parts together. When not in use, the implement shank can be detached from the hitch receiver on the towing vehicle by withdrawing the draw pin.

Typical methods of attaching implements with either hollow tube type shanks or solid shanks to square tube hitch receivers have many disadvantages. When a conventional securing or draw pin is used, the connection is not tight so there is undesirable movement between the implement shank and hitch receiver. This movement causes wear on both implement shank and hitch receiver. Excessive wear after time destroys the protective finish on both implement shank and hitch receiver, and allows rust to form causing serious problems when attempting to separate the implement shank and hitch receiver. Rust forms when the elements, rain, salt, road grit, etc., enter between the inner walls of the hitch receiver and the outer walls of the implement shank. The rust expands in the small space between the shank and the hitch receiver and solidifies, in effect making the two parts one solid piece. Attempts to prevent rust from forming include painting, plating, or greasing the shank. All of these rust prevention techniques are worn off very quickly due to the constant movement between the implement shank and hitch receiver, and thus do not prevent rust from forming over the long term.

It is also common for the holes in both the implement tube and the hitch receiver to become elongated over time due to frequent heavy load yanking of the implement shank in the hitch receiver. This is caused by the constant starting and stopping of the towing vehicle, and the momentum weight placed on the hitch, and in particular, concentrated on the pin and the hole. In the case of the solid shank, when a conventional securing or draw pin is used, it is common for the holes in only the hitch receiver to become elongated over time for the same reasons.

In the case of the hollow tube type shank, in an effort to reduce the slack and stabilize the implement, it is common practice to install a second apparatus such as a collar that may contain one or more bolts that are tightened against the outside of the square tube walls of the hitch receiver. Another alternative is to use a wedge-shaped device that is inserted between the walls of the square tube of the implement and the square tube of the hitch receiver. In the case of the solid shank used in heavy duty applications, stabilizing collars and wedges are seldom utilized in that they are light duty in nature.

Another problem with the conventional draw pin is that when towing undesirable movement between the implement shank and hitch receiver transfers undesirable "play" to the unit in tow, and in the case of any type of rack attached to the hitch receiver (i.e. bicycle rack), this movement is transferred to the rack and causes it to wobble. In the case of the hollow tube type shank, stabilizing collars/wedges are commonly used to solve this problem.

Apart from the problems where the hitch receiver becomes stretched and the draw pin holes elongated, there is a security problem associated with the conventional draw pin used in a two-part hitch. This is because the draw pin is easily removed and therefore makes an easy theft target. Locks for draw pins have been developed, but these locks are subject to corrosion from road grit, road salt and weather elements, and hence the locks become unworkable over time. Such locks are also easily broken or damaged, thereby rendering them ineffective.

Another problem with the hollow tube type shank implements and solid shank implements, and square tube hitch receivers is that in the case of the hollow tube type shank, both tubes become concave on the sides if a single long bolt is used to fasten the two parts together. In the case of the solid shank, only the hitch receiver tube will become concave if fastened in the same fashion. This occurs when the single bolt is passed through the sidewalks of both the implement shank and the hitch receiver. The long bolt is secured with a nut which is tightened from one side only. The tightening of the single nut on the long bolt forces the sidewalls of one, or both, tubes together. While such tightening will marginally reduce side to side slack and movement, it will not reduce up and down slack and movement. Further, the irregular distorted concave shape of one, or both, tubes may cause difficulty in attempting to separate the implement shank from the hitch receiver.

SUMMARY OF INVENTION

A split shank is secured to a drawbar, equalizer hitch, and the like. The two sides of the shank are tapered slightly towards the back end. They may be stabilized, and spaced, with an angular bracket at the front end. Each piece of the shank has threaded holes along the side for securing it to the hitch receiver with a bolt and lock washer from each side. There are also non-threaded holes for securing the shank to the hitch receiver with a conventional draw pin in the case of frequent installation and removal.

To connect the split shank to the hitch receiver secured to the towing vehicle, the split shank of the implement is placed in the square tube of the hitch receiver, and the holes in the side of the sidewalls of the hitch receiver are aligned with the threaded holes in the sidewalls of the split shank of the implement. Two bolts are then inserted, one from each side, along with lock washers, and are tightened in the threads of the sidewalls to conventional tightness.

To connect the hollow square shaped tube split shank and the hitch receiver, the square shaped split tube, with nuts secured therein, is placed in the square tube of the hitch receiver, and the holes in the side of the sidewalls of the hitch receiver are aligned with the threaded holes in the sidewalls of the implement. The two bolts are then inserted, one from each side, along with lock washers, and are tightened in the nuts to conventional tightness.

For other embodiments of the split shank, the basic principle of connection is the same, although in some embodiments, only one bolt is used.

The invention is directed to a split shank implement for detachably securing with a hitch receiver having holes in the walls thereof comprising: (a) a first elongated shank extending longitudinally from the implement for insertion into the interior of the hitch receiver; (b) a second elongated shank extending longitudinally from the implement, adjacent the first shank for insertion into the interior of the hitch receiver; and (c) a hole formed in the first shank and when the split shank is inserted fully into the hitch receiver, aligned with a hole in the hitch receiver. A second hole can be formed in the second shank in alignment with the first hole, and when the split shank is inserted fully into the hitch receiver, aligned with a hole in the hitch receiver.

The first shank and the second shank can taper slightly towards each other at ends opposite the ends which are connected to the implement. A plurality of aligned holes can be formed in the first shank and the second shank. One of the plurality of holes can be threaded.

The first elongated shank and the second elongated shank can be formed from an elongated tube with an elongated slot on two opposite sides separating the tube into a first shank and a second shank. The first shank and the second shanks can have rectangular cross-section shapes or can be in the shape of inwardly facing channels. The inwardly facing channels can have bolts securing nuts therein.

The split shank in one embodiment can have only one hole in one of the shanks, the hole being threaded and a bolt penetrating through the threaded hole and applying an outward force against the shank that does not have a hole in it.

The first shank can have an outwardly facing channel shape, the second shank can have a channel shape facing away from the first channel shape shank, and the interiors of the first and second channels can have securing nuts therein.

The first shank can have a rectangular cross-section shape and the second shank can have an outwardly facing "V" cross-section shape.

BRIEF DESCRIPTION OF DRAWINGS

In drawings which illustrate specific embodiments of the invention, but which should not be construed as restricting the spirit or scope of the invention in any way:

FIG. 1 illustrates a perspective view of the novel split shank implement, according to the invention.

FIG. 3 illustrates a perspective view of a second embodiment of a split shank. The split shank is in the form of a split square tube, which fits within the square tube of the hitch receiver.

DESCRIPTION

The invention is directed to a threaded and/or non-threaded split shank for a hitch receiver drawbar, implement, and the like, and a means of securing that split shank to the hitch receiver with two bolts, one from each side, or a draw bolt, or if need be a conventional draw pin. A major advantage of the invention is that it eliminates the need to use a conventional securing or draw pin to secure the implement shank in the hitch receiver. The invention, by using a split shank, and a pair of bolts, or a draw bolt, spreads the forces throughout and between the shank and hitch receiver, and thus high localized force on the point where the conventional pin impinges on the hole in the hitch receiver is greatly reduced. Hence, the hole(s) do not enlarge with use and the shank and hitch receiver stay snug with one another. The disadvantages inherent in connecting a conventional implement with a conventional hitch receiver using a conventional draw pin are eliminated by using the dual bolt securing system provided within the split shank.

FIG. 1 illustrates a perspective view of a first embodiment of the novel split shank implement. As seen in FIG. 1, the split shank 2 is constructed of an implement 4 with a pair of near parallel shanks 6 and 8 extending longitudinally from one side thereof. The pair of shanks 6 and 8 have three aligned holes 10, 12 and 14 drilled therethrough. Holes 12 are threaded. The implement 4 also can have one or more vertically arranged holes drilled therethrough, if required. It is understood that the implement 4 can be a towbar, a bike rack, or the like, or any other device that needs to be detachably secured to a vehicle.

Figure 2:
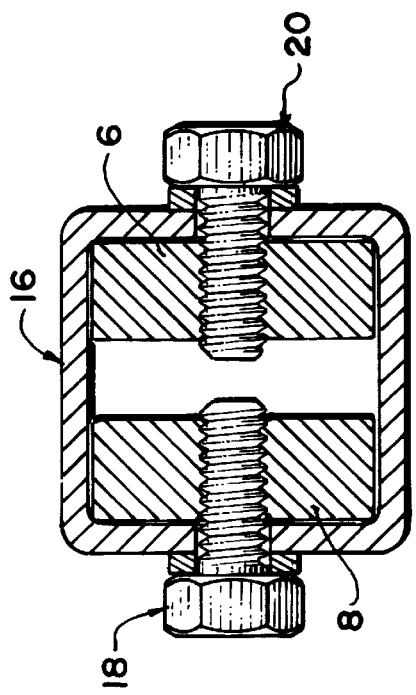
FIG. 2 illustrates a section view of a split shank in a square tube hitch receiver, the two parts being secured together by a pair of bolts.

FIG. 2 illustrates a section view of the split shank in a square tube hitch receiver, the two parts being secured together by a pair of bolts. As seen in FIG. 2, the split shank 6,8 is secured to and inside the square tube 16 of the hitch receiver by utilizing two bolts 18,20, one bolt being inserted in each side of the sidewalls of the hitch receiver 16 and tightened in the threads of the middle holes 12 in the split shank 6,8. By using the threaded securing system within the split shank 6,8, the outer walls of the split shank implement 6,8 and the inner walls or the hitch receiver 16 are cinched tightly together and movement or slack is eliminated. The important effect of this connection system is that forces are distributed over broad areas, and forces which tend to loosen the connection are not localized. This connection system also prevents movement and attendant wear on the split shank implement 6,8 and the hitch receiver 16 because the split shank implement 6,8 is held steady in position in the hitch receiver 16. Theft is deterred because a wrench is required to remove the two securing bolts 18,20 and this is time consuming.

The sidewalls of the hitch receiver 16 also do not become distorted or concave in shape because the split shank implement 6, 8 and the hitch receiver 16 are secured together by utilizing two bolts 18,20, one from each side. When a single bolt which threads from one side of the hitch receiver to the other and is secured with a single nut, it has a distinct disadvantage in that the walls of the hitch receiver are drawn together. After a time, it may be difficult to remove the implement from the hitch receiver.

FIG. 3 illustrates a perspective view of a second embodiment of a split shank. The split shank is in the form of a split square tube 22 which has a pair of slots 24 in the top and bottom thereof. If necessary, and to have the same advantages and to function in the same way as the split shank 6,8 shown in FIG. 1, the split hollow tube type shank shown in FIG. 3 has a pair of securing nuts therein (not shown) aligned to the holes 10 because the walls of the square tube 22 are usually not thick enough to use threads in the walls of the hole, or in some cases, additional thread strength is required.

Figure 4:
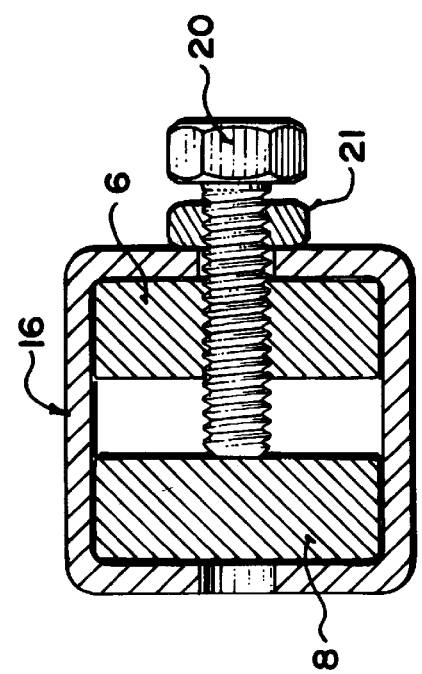
FIG. 4 illustrates a section view of a third embodiment of the split shank, with a hole drilled in only one of the bars and one bolt used to tighten the split shank in the hitch receiver.

FIG. 4 illustrates a section view of a third embodiment of the split shank, with a hole drilled in only one of the bars and one bolt used to tighten the split shank in the hitch receiver. The third embodiment illustrated in FIG. 4 comprises a pair of shank bars 6,8, similar to the one shown in FIGS. 1 and 2, except that a hole is drilled in only one bar 6. The adjacent wall of the square tube hitch receiver 16 can still have a hole so that it is not necessary to have two models of hitch receiver 16. Only one bolt 20 and lock nut 21 are required. However, an important feature of this design of split shank is that the bolt 20 is sufficiently long that it applies a force against bar 8, which in turn applies a force against the adjacent inner wall of hitch receiver tube 16. In this way, the important feature of the invention, spreading the friction forces, and drawing forces, throughout the split shank/hitch receiver combination is achieved. Thus the split shank does not loosen within the hitch receiver tube 16, as would be the case if the friction forces were not spread, and towing force was applied at the draw pin in the draw pin hole, which tends to stretch the hole and make the connection loose.

Figure 5:
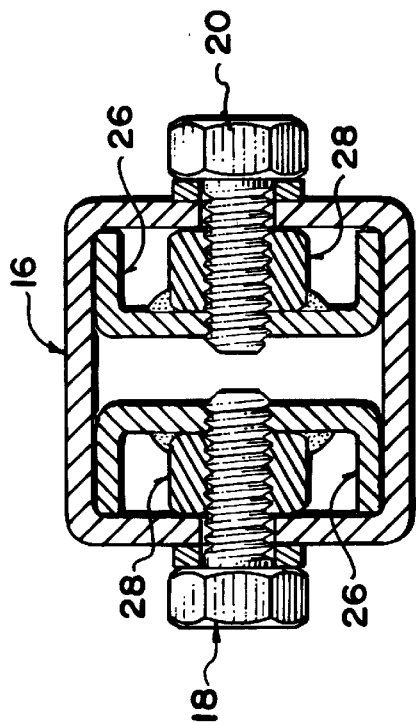
FIG. 5 illustrates a section view of a fourth embodiment of the split shank, with the two shanks formed of outwardly facing channels, and a pair of bolts tightening the pair of channels to the hitch receiver.

FIG. 5 illustrates a section view of a fourth embodiment of the split shank, with the two shanks formed of outwardly facing channels, and a pair of bolts tightening the pair of channels to the hitch receiver. The fourth embodiment of split shank illustrated in FIG. 5 utilizes a pair of outwardly facing channels 26 and a pair of nuts 28 secured in the hollows of the channels 26. By cinching the bolts 18 and 20 respectively, the pair of channels 26 are forced against the interior side walls of the hitch receiver tube 16. The advantage of this design is that the channels 26 tend to spread the forces in both lateral and vertical direction, thereby stabilizing the shank inside the hitch receiver in more than one direction.

Figure 6:
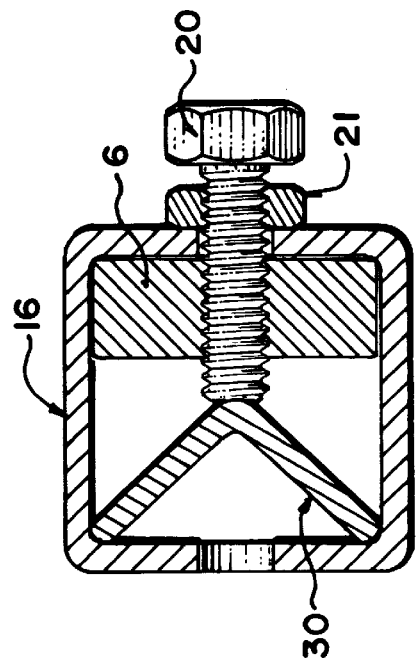
FIG. 6 illustrates a section view of a fifth embodiment of the split shank, with one of the two shanks formed in the shape of an outwardly facing "V", and one bolt tightening the split shank in the hitch receiver.

FIG. 6 illustrates a section view of a fifth embodiment of the split shank, with one of the two shanks formed in the shape of an outwardly facing "V", and one bolt tightening the split shank in the hitch receiver. The fifth embodiment of split shank illustrated in FIG. 6 utilizes a bar shank 6 and a parallel angle shank 30 which faces outwardly. The shank 6 is pulled against the inner adjacent wall of hitch receiver 16 by tightening the bolt 20. However, at the same time, the internal end of the bolt 20 forces the angle shank 30 against the inner upper and lower corners of the hitch receiver 16. This, as with the embodiment illustrated in FIG. 5, tends to distribute and spread the connection forces in both lateral and vertical directions.

The split shank according to the invention has a number of important advantages, as follows:

(1) The split shank 6, 8 is tapered towards it free end and is thus easier to insert into the hitch receiver. The split shank 6, 8 has a "spreading" action. When the bolts 18 and 20 are tightened, it "opens up" to fit securely inside the hitch receiver tubing 16. When the bolts 18, 20 are loosened, the split shank 6, 8 contracts and moves away from the interior side walls of the hitch receiver 16 and is thus easier to remove than conventional two-part hitches. The tapered split shank 6, 8 also facilitates removal if it is rusted in the hitch receiver 16.

(2) The split shank 6, 8 can be plated or painted, and greased prior to insertion in the hitch receiver 16. And since the securing forces are distributed broadly, and there is virtually no movement, rust is virtually eliminated.

(3) The outer edges of the split shank 6, 8 are square and when they are fastened tight against the interior side walls of the hitch receiver by the two bolts 18,20, these edges tighten into the rounded corners of the hitch receiver 16 and prevent any vertical (up and down) and lateral (side to side) movement of the shank 6, 8 inside the hitch receiver 16.

(4) The split shank 6, 8, when bolted securely into the hitch receiver 16, serves as a reinforcement to the tube of the hitch receiver 16, and thereby adds strength to the hitch receiver 16.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A split shank implement for detachably securing with a hitch receiver having holes in walls thereof comprising: a tube which includes
    (a) a first elongated shank extending longitudinally from the implement for insertion into an interior of the hitch receiver;
    (b) a second elongated shank extending longitudinally from the implement, adjacent the first shank for insertion into the interior of the hitch receiver, said first shank and said second shank separated by a longitudinal slot; and
    (c) a first hole formed in the first shank and when the split shank is inserted fully into the hitch receiver, aligns with a hole in the hitch receiver.

2. A split shank as claimed in claim 1 wherein a second hole is formed in the second shank in alignment with the first hole, and when the split shank is inserted fully into the hitch receiver, aligns with a hole in the hitch receiver.

3. A split shank as claimed in claim 2 wherein the first shank and the second shank taper towards each other at ends opposite the ends which are connected to the implement.

4. A split shank as claimed in claim 2 wherein a plurality of aligned holes are formed in the first shank and the second shank.

5. A split shank as claimed in claim 4 wherein one of the plurality of holes is threaded.

6. A split shank as claimed in claim 2 wherein the first elongated shank and the second elongated shank are formed from an elongated tube with an elongated slot on two opposite sides separating the tube into a first shank and a second shank.

7. A split shank as claimed in claim 6 wherein the first shank and second shanks have bolt securing nuts aligned with the holes in the first and second shanks.

8. A split shank as claimed in claim 2 wherein the first shank and the second shank are in a shape of inwardly facing channels.

9. A split shank as claimed in claim 2 wherein the first shank has an outwardly facing channel shape, the second shank has a channel shape facing away from the first channel shape shank, and the interiors of the first and second channels have securing nuts therein.

10. A split shank as claimed in claim 1 wherein the first shank and the second shanks have rectangular cross-section shapes.

11. A split shank as claimed in claim 10 wherein only one of the first shank and the second shank has a hole in it, the hole is threaded, and a bolt penetrates through the threaded hole and applies an outward force against the shank that does not have a hole in it.

12. A split shank as claimed in claim 1 wherein the first shank has a rectangular cross-section shape and the second shank has an outwardly facing "V" cross-section shape.

* * * * *